(12) United States Patent
Lundell et al.

(10) Patent No.: US 7,040,155 B1
(45) Date of Patent: May 9, 2006

(54) SENSOR HOUSING FASTENING ARRANGEMENT IN WHEELS WITH PNEUMATIC TIRES

(75) Inventors: Tomi Lundell, Tampere (FI); Jukka Hakanen, Tampere (FI); Ari Tuunanen, Tampere (FI); Jari Kirjanen, Nokia (FI)

(73) Assignee: Nokian Tyres PLC, Nokia (FI)

( * ) Notice: Subject to any disclaimer, the term of this patent is extended or adjusted under 35 U.S.C. 154(b) by 0 days.

(21) Appl. No.: 11/004,610

(22) Filed: Dec. 2, 2004

(51) Int. Cl.
*B60C 23/03* (2006.01)

(52) U.S. Cl. .................................... 73/146.8
(58) Field of Classification Search ............. 73/146.8, 73/146.3; 340/442, 443, 444, 445
See application file for complete search history.

(56) References Cited

U.S. PATENT DOCUMENTS

| | | | |
|---|---|---|---|
| 5,090,237 A * | 2/1992 | Schrumpf et al. ......... | 73/146.5 |
| 5,844,131 A | 12/1998 | Gabelmann et al. | |
| 5,956,820 A | 9/1999 | Albinski | |
| 6,055,855 A * | 5/2000 | Straub ....................... | 73/146.8 |
| 6,805,000 B1 * | 10/2004 | Sheikh-Bahaie ........... | 73/146.8 |
| 6,912,897 B1 * | 7/2005 | Luce ......................... | 73/146.8 |

* cited by examiner

*Primary Examiner*—Jewel V. Thompson
(74) *Attorney, Agent, or Firm*—Klarquist Sparkman, LLP

(57) ABSTRACT

An assembly with an electronic measuring apparatus for installing said electronic measuring apparatus on a rim of a vehicle wheel, on which a pneumatic tire may be mounted comprises: at least one sensor for sensing value(s) inside the mounted pneumatic tire; a housing having a bottom side adapted to seat against a rim bed in said rim, an outer side, and an attaching side connecting said bottom side and outer side; a tire valve body having a stem projecting through an opening in the rim and a shoulder extending radially at one end said valve body, and a locking piece for engagement with said stem to secure said tire valve body to said rim; an eccentric attachment component in said shoulder, said attachment component being eccentric in respect to said stem and having a length projecting away from said shoulder in an opposite direction than said stem; and a receiving hole or receiving recess in the attaching side of said housing for receiving said eccentric attachment component, whereupon said housing is movable in a plane perpendicular to the length of said eccentric attachment component.

40 Claims, 4 Drawing Sheets

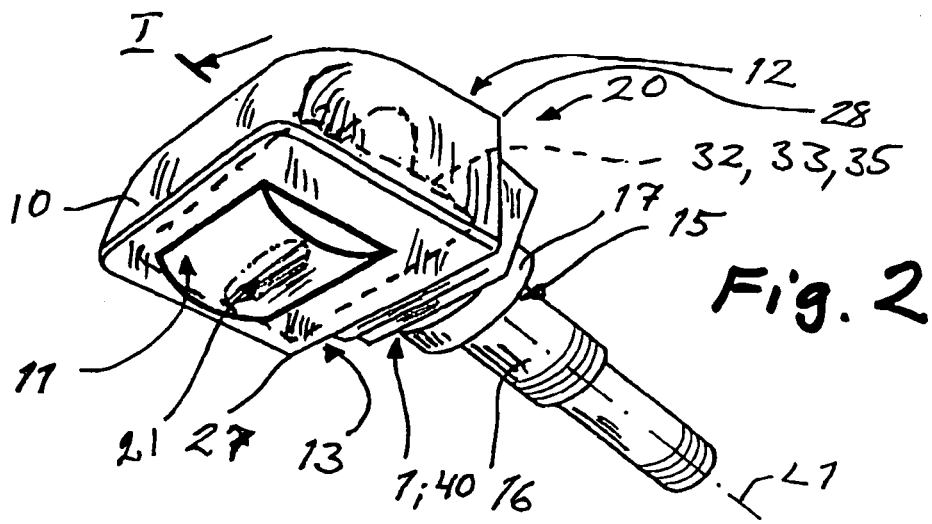
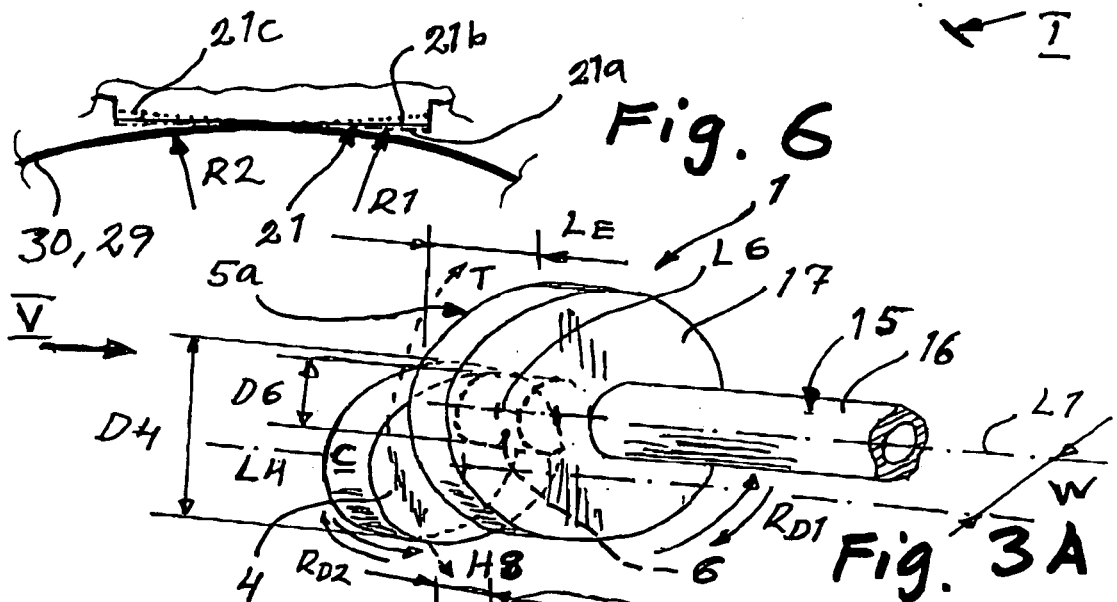
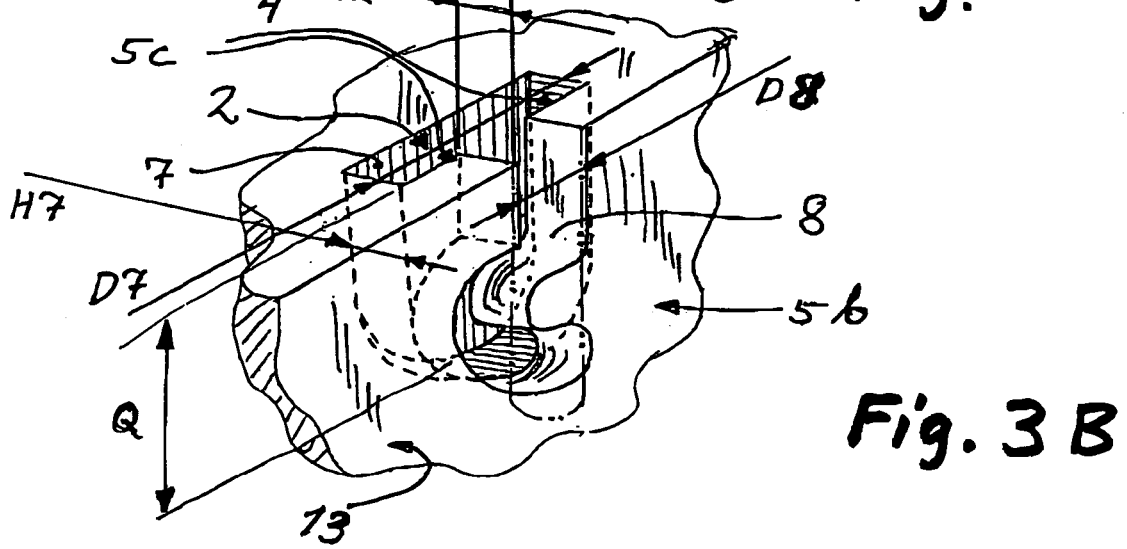
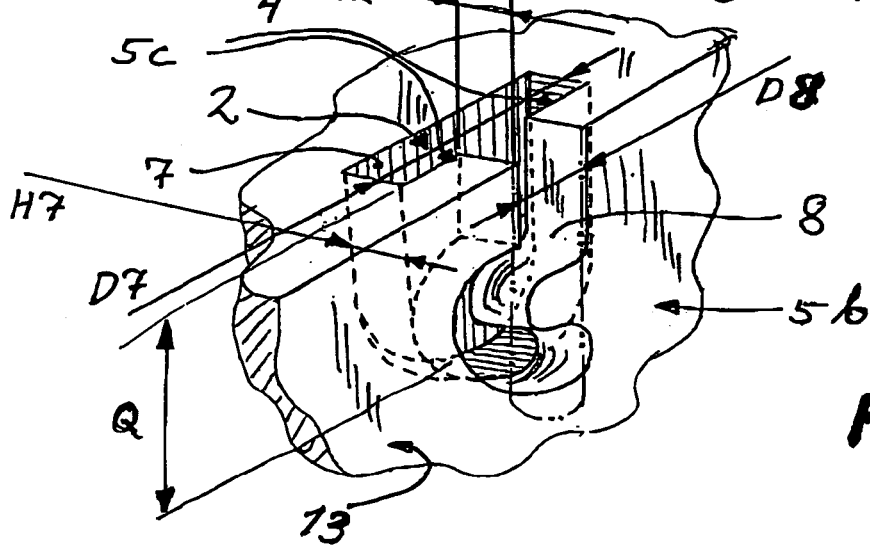

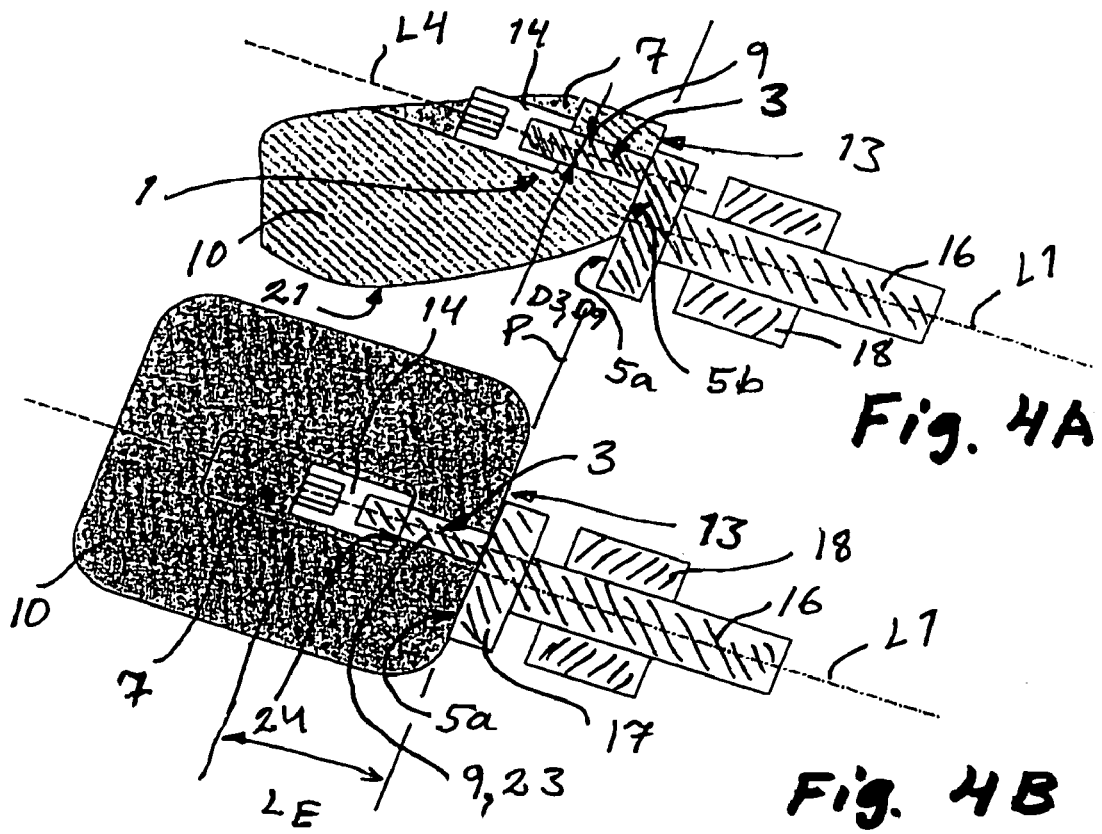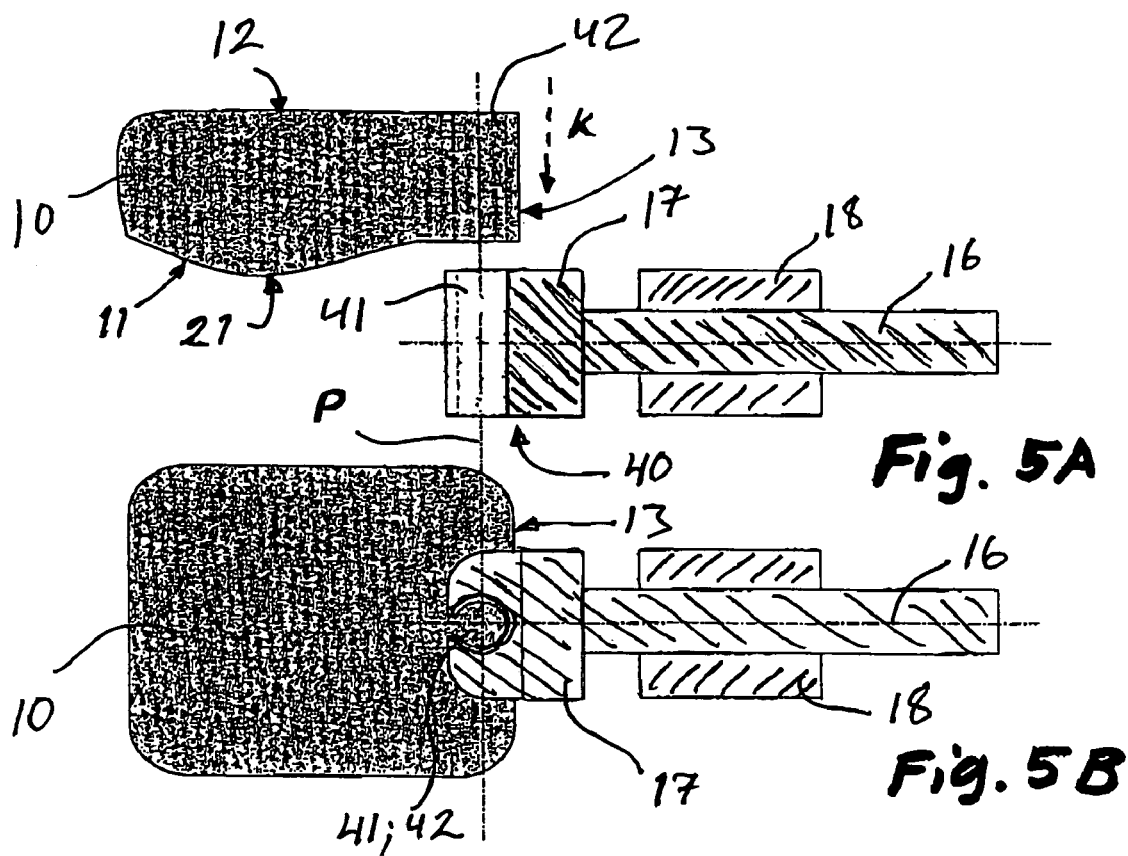

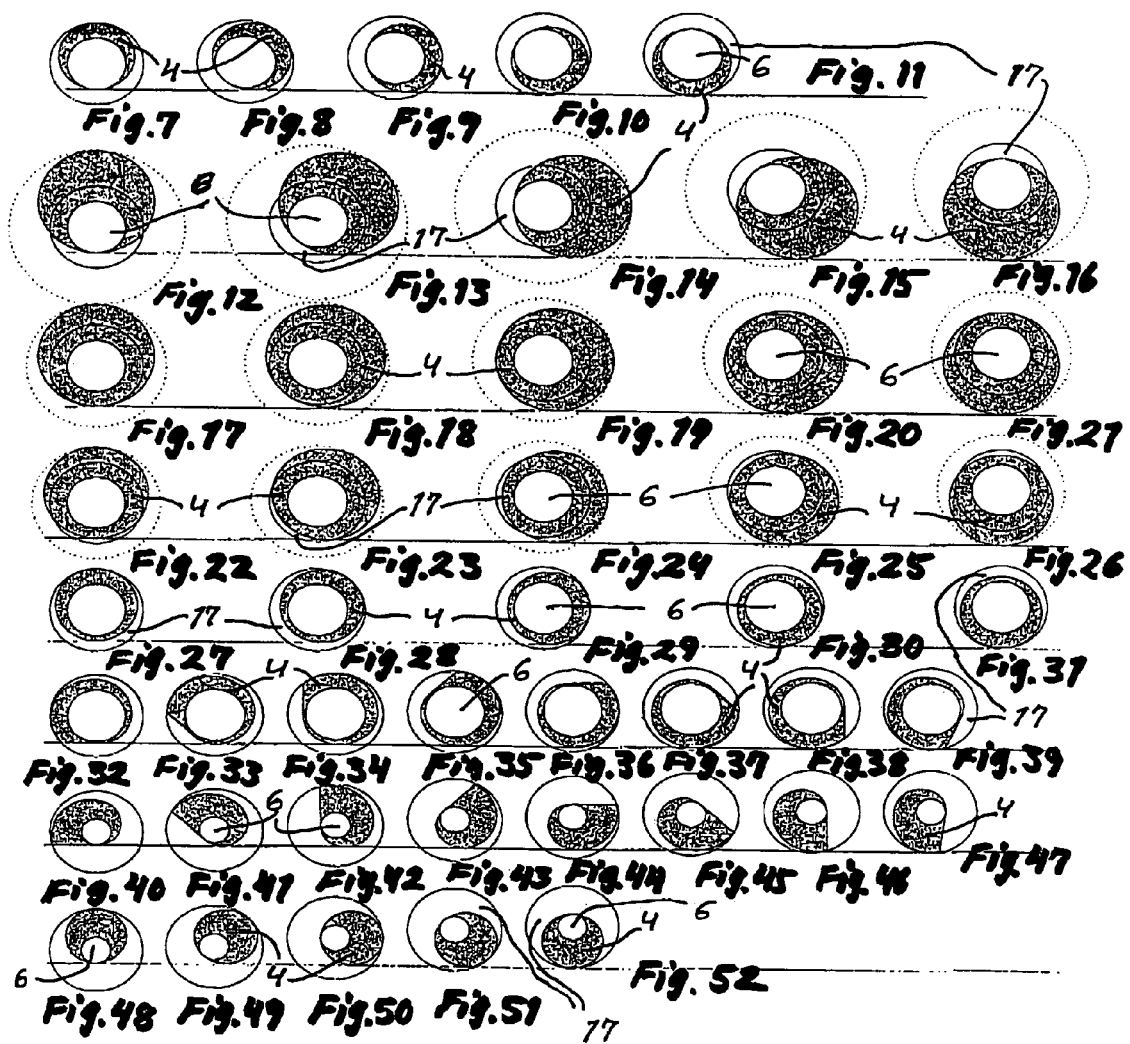

SENSOR HOUSING FASTENING ARRANGEMENT IN WHEELS WITH PNEUMATIC TIRES

FIELD

The invention relates to an assembly for attaching an electronic measuring apparatus in the rim of a vehicle wheel on which a pneumatic tire may be mounted. The electronic measuring apparatus is contained in a housing and comprises at least one sensor for sensing a value or values inside the mounted pneumatic tire, and electronics for processing said value(s). The measuring housing is attached utilizing the tire valve.

BACKGROUND

Patent publication U.S. Pat. No. 5,956,820 discloses a device and method for attaching the electronic module to a vehicle tire rim. The device includes a spring element having a fastening wing and a clamping wing. A valve body is coupled to the fastening wing and the clamping wing is coupled to the electronic module to clamp the electronic module against the vehicle tire rim. The electronic module has two legs on its underside to form contacting point against the rim. The method comprises coupling a spring element to a drop base of the vehicle wheel rim, clamping the electronic module between the spring element and the drop base, positioning a first bottom portion of the electronic module into a first seat position, positioning a second bottom portion of the electronic module into a second seat position, and positioning a center of gravity of the electronic module between a line formed between the first and second seats position and the drop base.

Patent publication U.S. Pat. No. 5,844,131 concerns an apparatus for measuring the tire pressure in a pneumatic tire of a vehicle by means of a measurement value sensor, which is acted upon by the tire pressure. On the rim bed of a rim, which accommodates a tire valve for the pneumatic tire, connected to the tire valve there is a signal housing, which is associated with the rim bed and which includes an electronic sender means as the measurement value sensor for the tire pressure. The signal housing is connected to the tire valve by a hollow screw, which engages into the valve bore and is adjustable relative thereto in such a way that the tire valve/signal housing combination can be used for equipping different rim cross-sections. That purpose is also served by the base bar portions projecting away from the bottom surface of the signal housing. The hollow screw together with the two base bar portions that rest on the rim bed, an operationally reliable three-point fixing for the signal housing is attained. The valve body is provided with an axial bore and at the end remote from the valve cap, the valve base, it is provided with a radially projecting collar, which provides a spherical peripheral surface for tilting of the signal housing to have different angles in respect to the longitudinal axis of the valve body. This is attained in particular by virtue of the part-spherical configuration with the negative part-spherical surface and the co-operating portion, the peripheral surface of the valve collar.

Patent publication U.S. Pat. No. 6,055,855 discloses an apparatus that mounts on a rim of a vehicle wheel on which a tire may be mounted. The apparatus comprises a tire pressure sensor, a first threaded fastener, and a tire valve stem. The tire pressure sensor senses the pressure in the tire and has a housing with a pocket. The first threaded fastener is mounted in the pocket in the housing and has a first threaded portion extending along an axis. The first threaded fastener and the housing have surfaces blocking rotation of the first threaded fastener about the axis. The tire valve stem projects through a first opening in the rim and through a second opening in the housing into the pocket. The tire valve stem has a second threaded portion for threaded engagement with the first threaded portion upon relative rotation of the first and second threaded portions about the axis. The tire valve stem and the first threaded fastener clamp a part of the housing between the tire valve stem and the first threaded fastener when the first and second threaded portions are threaded together. The housing portion includes a first spherical or cylindrical surface and the tire valve stem includes a second spherical or cylindrical surface facing and clamping against the first spherical or cylindrical surface when the first and second threaded portions are threaded tightly together. These spherical or cylindrical surfaces allow tilting of the sensor housing in respect to tire valve axis.

SUMMARY

The general object of the invention is to attain an assembly or combination of sensor(s)-electronics carrying unit and a rim of vehicle tires, which ensures easy and secure fastening of the unit to the rim regardless of the rim type and rim form.

According to the first aspect of the invention it is provided an assembly with an electronic measuring apparatus for installing said electronic measuring apparatus on a rim of a vehicle wheel, on which a pneumatic tire may be mounted, said assembly comprising: at least one sensor for sensing a value or values inside the mounted pneumatic tire, and electronics for processing said value(s); a housing, in which said sensor and said electronics are contained, said housing having a bottom side adapted to seat against a rim bed in said rim, an outer side directed toward said tire when mounted, and an attaching side connecting opposite borders of said bottom side and outer side and transverse thereto; a tire valve body having a stem projecting through an opening in the rim and a shoulder extending radially at one end of said valve body, and a locking piece for engagement with said stem to secure said shoulder and said stem to said rim; an eccentric attachment component in the shoulder of said tire valve body, said attachment component being eccentric in respect to said stem and having a length projecting away from said shoulder in an opposite direction than said stem; and a receiving hole or receiving recess in the attaching side of said housing for receiving said eccentric attachment component, whereupon said housing is movable in a plane perpendicular to the length of said eccentric attachment component.

According to the second aspect of the invention it is provided a combination of an electronic measuring apparatus and a rim of a vehicle wheel, on which a pneumatic tire may be mounted, said combination comprising: a sensor for sensing a value or values inside the mounted pneumatic tire, and electronics for processing said value(s); a housing with said sensor and said electronics therein, said housing having a bottom side adapted to seat against a rim bed of said rim, an opposite outer side, and a transversal attaching side connecting said bottom side and said outer side; a tire valve body having a stem projecting through an opening in the rim and a shoulder extending radially at one end said valve body, and a locking piece for engagement with said stem to secure said shoulder and said stem to said rim; an eccentric attachment component on said shoulder of the tire valve body and projecting away from said shoulder in opposite direction than said stem, said eccentricity being in respect to said stem; a receiving hole or receiving recess in said attaching side of the housing for receiving said eccentric attachment component; and a planar base surface on said shoulder and a planar support surface on said attaching side, said planar base and support surfaces being in contact with each other.

According to the third aspect of the invention it is provided an assembly with an electronic measuring apparatus for installing said electronic measuring apparatus on a rim of a vehicle wheel, on which a pneumatic tire may be mounted, said assembly comprising: at least one sensor for sensing a value or values inside the mounted pneumatic tire, and electronics for processing said value(s); a housing, in which said sensor and said electronics are contained, said housing having a bottom side adapted to seat against a rim bed in said rim, an outer side directed towards said tire, and an attaching side connecting opposite borders of said bottom side and outer side and transverse thereto; a tire valve body having a stem projecting through an opening in the rim and a shoulder extending radially at one end said valve body, and a locking piece for engagement with said stem to secure said shoulder and said stem to said rim; a projecting attachment component or a receiving groove in said shoulder of the tire valve body in a plane transverse to the stem; and a receiving groove or a projecting attachment component respectively in said attaching side of the housing, opposite and in engagement with said projecting attachment component or said receiving groove of the shoulder, whereupon said housing is movable in a plane transverse to the stem.

BRIEF DESCRIPTION OF THE DRAWINGS

The foregoing summary, and the following detailed description of the preferred embodiments of the present invention, will be better understood when read in conjunction with the accompanying drawings, in which:

FIG. 2 represents the electronic measuring apparatus with the attachment means of FIGS. 1A to 1C from outside towards the bottom side of the housing, in axono-metric view in approximate direction II.

FIGS. 3A and 3B represents the structure of the eccentric attachment component and the structure of the receiving recess respectively of the embodiment of FIGS. 1A to 1B, in detail and separated from other parts of the assembly/combination in axono-metric views in approximate direction III. One of the alternative further configurations for the curved channel is shown by phantom line in FIG. 3B.

FIGS. 4A and 4B represent schematically the electronic measuring apparatus with the second embodiment of the attachment means according to the invention; FIG. 4A in the same cross-sectional view as in FIGS. 1A to 1C, and FIG. 4B seen from outside towards the axel line of the wheel in approximate direction IV.

FIGS. 5A and 5B represent schematically the electronic measuring apparatus with the third embodiment of the attachment means according to the invention, in the same views as in FIGS. 4A and 4B.

FIG. 6 represents the different forms of the bottom side of the housing for attaining a single contact area between the rim bed and the housing, in a cross-sectional view along plane VI—VI.

FIGS. 7 to 52 show a plurality of arrangements, in which the diameter of the flange and the diameter of the shaft has different values, the position of the flange and the position of the shaft is different in respect to the shoulder of the tire valve, the flange being visualized with grey, seen in direction V. In FIGS. 32 to 47 the periphery of the flange has a modified configuration.

DETAILED DESCRIPTION

Figure 1A:
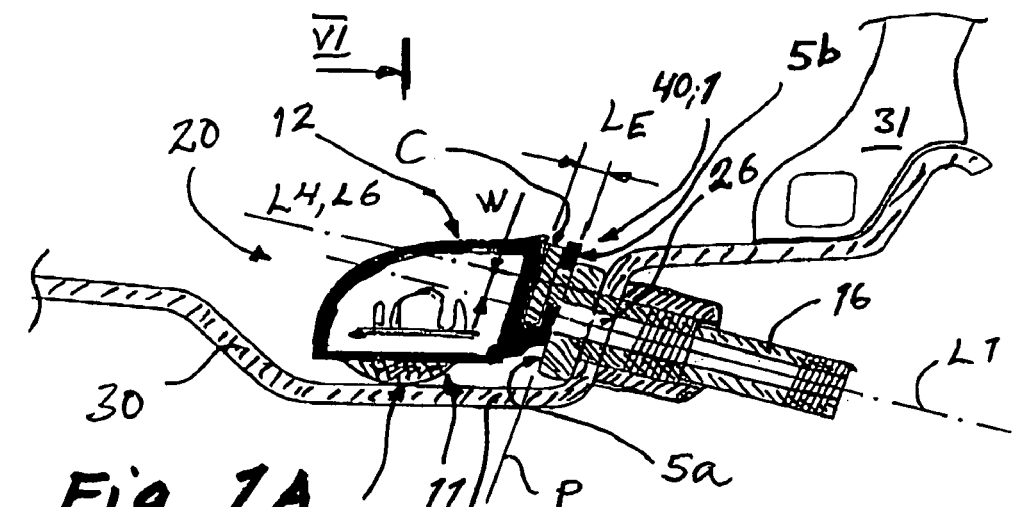
FIGS. 1A to 1C represent the positioning of the electronic measuring apparatus in three different rims of vehicle wheels using one preferred embodiment of the attachment means according to the invention, in identical cross-sectional views along a plane I—I that goes through the axle line of the wheel. The axle line of the wheel is parallel with the plane of the drawing.

The figures show an assembly or a combination, in which an electronic measuring apparatus 20 is installed on a rim 30 of a vehicle wheel using the construction of the invention. The electronic measuring apparatus 20 has at least one sensor 32 for sensing a value or values inside the mounted pneumatic tire, and electronics 33 for processing said values so that they are available to a user or an operator. This at least one sensor 32 is preferably a tire pressure sensor, and the apparatus may comprise also other type of sensors like a temperature sensor 35. The electronics 33 can for instance send the data concerning the tire pressure and other optional properties inside the tire by radiowaves into other places like a receiving apparatus not shown in the figures. The sensors and the electronics as well as other systems that can be utilized for this purpose are widely known, and accordingly are not explained in detail. The sensors and the electronics as well as other systems in the electronic measuring apparatus 20 can be any known or new type that is feasible for the purpose. The measuring apparatus 20 is at first attached to the rim 30 whereafter a pneumatic tire 31 of a proper type may be mounted on the rim.

The combination or assembly comprises a housing 10, in which said sensor and said electronics are contained. This housing 10 has a bottom side 11 that is adapted to seat against a rim bed 29 in said rim 30, an outer side 12 directed towards said tire when the tire is mounted on the rim, and an attaching side 13 connecting opposite borders 27, 28 of the bottom side and the outer side. The attaching side 13 is transverse to the bottom side 11 and the outer side 12. The outer side 12 can be configured as needed for mounting the tire 31, as can be understood from the figures. Accordingly, the housing 10 forms a cover for the electronics and sensor(s), the attaching side 13 is provided with means for attaching the whole unit to the rim so that the bottom side 11 is against the rim bed 29 and the unit is securely in place, whereupon the forces directed to the unit during use, i.e., during driving of the car with the wheels with installed units, do not cause its loosening or non-intended movement. The definition "unit" is here used to describe the housing with electronics, power source, sensors and attachment means. The unit is the complete arrangement that can be or is attached to the rim. The combination or assembly comprises also a tire valve body 15 having a stem 16 projecting through an opening 26 in the rim and a shoulder 17 extending radially at one end the valve body and a locking piece 18. The tire valve body 15 is connected to the housing, more precisely connected to the attachment side 13 of the housing as is disclosed later in this description. The locking piece 18 has inner configuration, like internal threads or teeth or snap-on-hooks or the like, for engagement with the stem, which has outer configuration, like externally threaded or toothed or snap-on-recessed portion or the like for the purpose. With tightening of the locking piece the rime 30 of the wheel is tightened and clamped between the shoulder of the tire valve body 15 and the locking piece 18, whereupon tire valve body 15 and also the housing 10 connected thereto is secure to the rime 30. This way the shoulder 17 is positioned tightly against the rim.

According to one embodiment of the invention the tire valve body 15 is provided with an eccentric attachment component 1, or more generally a projecting attachment component 40. Preferably the eccentric attachment component 1 is an integrated part of the valve body. More specifically the eccentric attachment component is fixed or same part with the shoulder 17 of the valve body. The attachment component 1 is eccentric in respect to said stem 16 and has a length $L_E$ projecting away from the shoulder in opposite direction than the stem. As and complementary part for this eccentric attachment component 1 the housing 10 is provided with a receiving hole 3 or receiving recess 2 in the attaching side 13 of the housing for receiving said eccentric attachment component 1. The shoulder 17 has a planar base surface 5a facing away from the rim, and the attaching side 13 of the housing has a planar support surface 5b facing towards the rim. The planar base surface 5a of the shoulder is perpendicular to the length $L_E$ of said eccentric attachment component. The planar base surface 5a of the shoulder and planar support surface 5b of the housing rest against each other forming a contact plane P, whereupon the base surface 5a and the support surface 5b are movable along each other during installation of the electronic measuring apparatus 20. Because of this contact between the planar surfaces the planar support surface is also perpendicular to the length of the eccentric attachment component. This means that the housing 10 is movable in the plane P perpendicular to the length LE of the eccentric attachment component. In this way the housing can be moved towards the rim bed 29 so that the place and position of the valve opening 29 of the rim is eliminated and the bottom side 11 of the housing would be in contact with the rim bed. Preferably the planar base surface and the planar support surface are perpendicular to the centerline L1 of the stem 16, whereupon the shoulder has a substantially even thickness H1. In this the stem or more specifically the case the centerline L1 of the stem is parallel with the length LE of said eccentric attachment component. Then the centerline L1 of the stem is also parallel with the centerlines L4 and L6 of the eccentric attachment component, which centerlines L4 and L6 define the direction rotational axis(es) of the eccentric attachment component. The rotational axis or axises are parallel with these centerlines L4 and L6. Alternatively the shoulder can have a wedgelike thickness, in which case the contact plane P is perpendicular to the length $L_E$ of the eccentric attachment component, but not perpendicular though transversal to the centerline L1 of the stem, meaning that the centerline L1 of the stem is not parallel with the centerlines L4 and L6 of the eccentric attachment component.

Figure 1B:
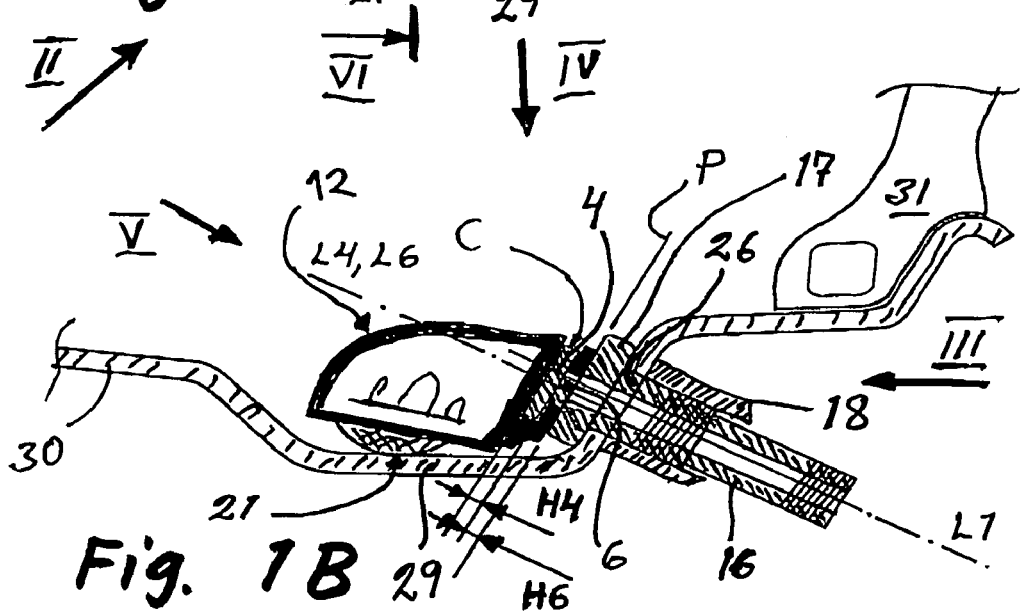
Figure 1C:
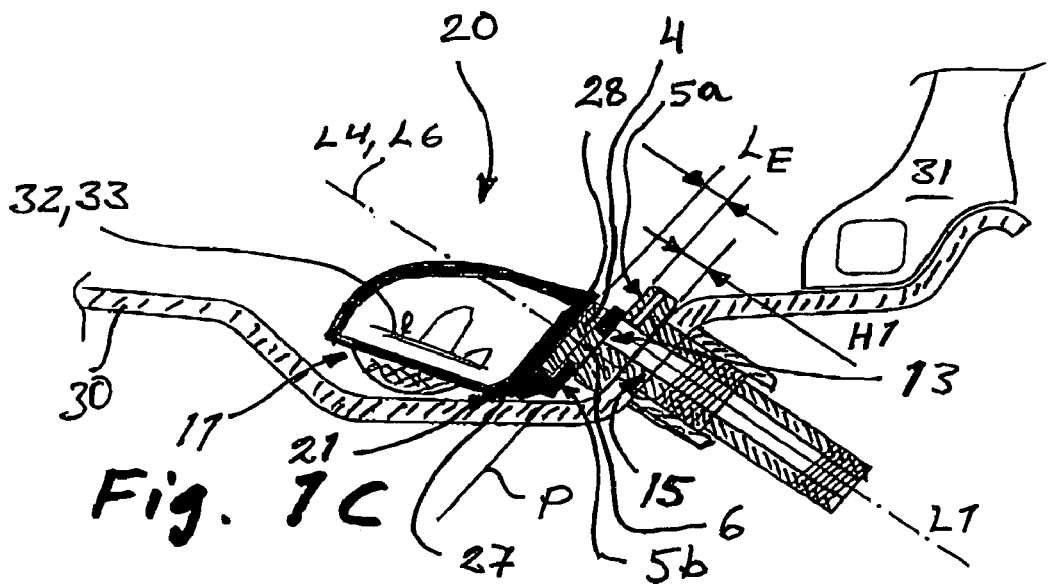

The mentioned eccentric attachment component 1 is a flange 4 with a periphery C that is eccentric in respect to the stem 16, more precisely the periphery is eccentric in respect to the centerline L1 of the stem, and connected with a shaft 6 to the shoulder 17. The periphery C of the flange is preferably circular. The flange 4 has a flange diameter D4, a flange thickness H4 and a centerline in the center of the periphery C, which centerline is called eccentric centerline L4. Eccentricity means that there is distance W between eccentric centerline L4 and the stem centerline L1, as can be seen in FIGS. 1A to 1C and 3A. The shaft 6, which connects the flange 4 to the shoulder 17, has a shaft diameter D6, a shaft length H6 and a shaft centerline L6. The flange diameter D4 is substantially larger than the shaft diameter D6. The shaft 6 is eccentric in respect to the shoulder 17, more precisely the shaft centerline L6 is eccentric in respect to the stem centerline L1. Typically and preferably the shaft centerline L6 is in line with the eccentric centerline L4, whereupon shaft centerline L6 is the eccentric centerline L4, and the flange and the shaft are coaxial, as shown in FIGS. 1A to 1C. Alternatively, the shaft centerline L6 may be eccentric in respect to said eccentric centerline as shown in FIG. 3A. Different embodiments for the size and eccentricity of the flange 4 and size and position of the shaft 6 in respect to each other and in respect to the shoulder 17 and stem 16. FIGS. 32 to 47 represent alternative, where the periphery C of the flange deviates from a whole circle, but is a combination of a portion of a main circle and a rounding and/or linear section. Accordingly, the periphery C in typically at least partly circular, though other forms can also be used.

The receiving hole 3 or receiving recess 2 in the housing 10 has a slot 7 for said flange, and a curved channel 8 enabling movement of the shaft 6 when the flange 4 is rotated in one of the opposite directions $R_{D1}$. The slot 7 of the recess 2 has a slot width D7 that is parallel with the support surface 5b and extend substantially in general or mean direction of the bottom side 11 and the outer side 12, whereupon the slot width dimension D7 would be at least approximately parallel with a tangent of the rim bed 29 when the electronic measuring apparatus 20 is installed on the rim 30. The slot width D7 is substantially equal with the flange diameter D4. The slot 7 also has a slot thickness H7 that is substantially equal will the flange thickness H4. The dimensions D7, 117 of the slot and the dimensions D4, H4 of the flange are matched so as to enable rotation of said flange 4 in the slot 7 around its eccentric centerline L4 that is perpendicular to the attaching side 13 of the housing. The curved channel 8 has a depth H8 that is substantially equal with the shaft length H6, and a width D8 that is substantially equal with the shaft diameter D6. The curved channel 8 is formed between the planar support surface 5b of the housing 10 and the inner planar surface 5c of the slot 7 directed in the opposite direction than the planar support surface 5b on both sides of the curved channel. The planar support surface 5b and the inner planar surface 5c are parallel. The mentioned transversal dimensions D8, H8 of the curved channel and the dimensions D6, H6 of the shaft are matched so as to enable rotation and movement of said shaft 6 in and along the curved channel 8 when the flange 4 is rotated inside the slot 7. The curved channel 8 has typically a form that resembles a letter S or a letter J, as visible in FIG. 3B, The form can be e.g. some of the cycloids or some of the helices. It is also possible to use linear curved channel 8, as shown in FIG. 3B. The slot has also a slot depth Q that extends in the direction between the 27, 28 of the bottom side and the outer side, which slot depth Q is at least approximately equal to the flange diameter D4. The slot 7 is open towards the outer side 12 of the housing 10 allowing insertion of the eccentric attachment component 1 in the beginning of the installation of the electronic measuring apparatus 20.

The second embodiment of the invention also comprise the planar base surface 5a of the shoulder 17 facing away from the rim, and the planar support surface 5b on the attaching side 13 of the housing facing towards the rim. Here too, the planar base surface 5a is perpendicular to the length LE of said eccentric attachment component, and the planar base surface 5a and planar support surface 5b rest against each other forming the contact plane P. The housing 10 is movable in the plane P perpendicular to the length $L_E$, of the eccentric attachment component. Instead of the flange and the respective slot for the flange, the eccentric attachment component 1 comprises a stud 9 with a stud diameter D9 and a nut 14. The stud has centerline forming the eccentric centerline L4 in this embodiment. The stud 9 has an outer configuration, like externally threaded or toothed or snap-on-recessed length or the like, and the nut 14 has inner configuration, like internal threads or teeth or snap-on-hooks or the like, for engagement with the stud. In this case the receiving hole 3 or receiving recess 2 is a hole 23 with a hole diameter D3 that matches with the stud diameter D9 so as to allow the stud go through the hole. When the nut is engaged on the stud and tightened against a surrounding support surface 24 on the housing facing away from the shoulder 17 of valve tire body. Accordingly, the stud 9 of this second embodiment is respective to the shaft 6 of the first embodiment, and the nut 14 this second embodiment is in away respective to the flange 4 of the first embodiment, and the hole 23 of this second embodiment is respective to the slot 7 and channel 8 of the first embodiment, all other components can be substantially similar. Hence the installation of these two constructions are substantially identical, the minor differences, like the mutual tightening or locking of the housing 10 and the eccentric attachment component 1, being in practice only slightly different, but equivalent.

In all embodiments of the invention the housing 10 has a single or one contact area 21 within the bottom side 11 thereof contacting with the rim bed 29 of the rim. For this purpose the bottom side 11 of the housing is either a concave surface 21$a$ with a smaller radius R1 than the rim bed R2, or a planar surface 211$b$, or a convex surface 21$c$. The reference numbers 21$a$–21 c are used for distinction of these different surface forms, the reference number 21 means this contact area generally. This single contact area 21 between the rim bed and the housing can change and typically changes its position along the bottom side 11 when the electronic measuring apparatus 20 is installed on rims 30 having different angles of inclination in respect to axle line of the wheel at the point of the valve opening 26, as shown in FIGS. 1A, 1B and 1C, in which the angles are about 17', 27°, 40°. When the unit is installed there is however only one contact area or contact point 21 with smaller or larger surface area. Typically it is not question about a point, but area with a length and a width, one example shown in FIG. 2 with a phantom line. Preferably that section of the bottom side 11 of said housing, and possibly some area around, which is intended for single contact area 21 is made of an elastic material. The elastic material compresses during installation enhancing a more sturdy support against the rim.

When the electronic measuring apparatus is installed using the housing 10 and the eccentric attachment component 1, the flange 4 is at first positioned in the slot 7, whereupon the shaft goes through the curved channel, or alternatively the stud 9 is put through the hole 23. Next the stem 16 is guided through the valve opening 26 in the rim and the shoulder pressed against the rim. The stem is rotated $R_{D1}$ around its centerline L1, which means that the eccentric attachment component I is simultaneously rotated $R_{D2}$ around the eccentric centerline L4. So, the flange 4 rotates $R_{D2}$ keeping its position inside the slot 7, and at the same time the shaft 6 moves along the channel 8. The flange also moves along a circular path T around stem centerline L1 in a plane parallel with the mentioned plane P towards or away from the rim bed. This causes movement of the housing 10 in the plane P, because of the gliding contact between the planar base surface and the planar support surface, either towards the rim bed or away from the rim bed depending on the rotation direction $R_{D1}$. When the bottom side 11 of the housing has reached a proper contact with the rim bed, the stem is finally tightened in its place to valve opening using the locking piece 18. If necessary and available the housing 10 can be additionally fixed with the eccentric attachment component 1 using components like the nut 14 or a locking polymer or the like. The eccentric centerline L4 and the stem centerline L1 are the main rotational axises.

The third embodiment of the invention also comprises the projecting attachment component 40 as an extension of the shoulder 17 in the tire valve body 15. Here too, the projecting attachment component 40 has a length $L_E$, projecting away from the shoulder in opposite direction than the stem 16. In this case the projecting attachment component 40 is provide either with a receiving groove 41 or with an attachment bar 42, whereupon the attaching side 13 of the housing 10 is provided with an attachment bar 42 or a receiving groove 41 respectively. The receiving groove 41 and the attachment bar 42 are complementary parts to each other. When the opposing receiving groove 41 can be brought in engagement with the attachment bar 42 of the projecting attachment component or vice versa, e.g. in direction K, the housing 10 is movable in a plane P transversal to the stem 16. The attachment bar 42 and the receiving groove 41 are linear components, and they can be locked to each other e.g. using a screw turned inside the groove.

According to the general idea of the invention the housing 10 moved in a plane P towards or away from the rim bed, the plane being formed as a projecting part—that projects away from said shoulder in the opposite direction than the stem— on the shoulder 17 of the tire valve body 15. In some of the embodiments, when the projecting attachment component is an eccentric attachment component 1 on said shoulder and said receiving recess is a receiving hole 23 or receiving slot 7 in said attaching side of the housing, this movement is the curved movement in the plane as explained in the context of the curved channel. In some of the embodiments, when the projecting attachment component is the attachment bar 42 on said shoulder and said receiving recess is a receiving groove 41 in said attaching side of the housing, or vice versa, this movement is a linear movement in the plane, as explained in the context of attachment bar and receiving groove.

In view of the many possible embodiments to which the principles of the invention may be applied, it should be recognized that the illustrated embodiments are only representative examples of the invention and should not be taken as a limitation on the scope of the invention. Rather, the scope of the invention is defined by the following claims. We therefore claim as our invention all that comes within the scope of the claims.

The invention claimed is:

1. An assembly with an electronic measuring apparatus for installing said electronic measuring apparatus on a rim of a vehicle wheel, on which a pneumatic tire may be mounted, said assembly comprising:

at least one sensor for sensing a value or values inside the mounted pneumatic tire, and electronics for processing said value(s);

a housing, in which said sensor and said electronics are contained, said housing having a bottom side adapted to seat against a rim bed in said rim, an outer side directed towards said tire when mounted, and an attaching side connecting opposite borders of said bottom side and outer side and transvere thereto;

a tire valve body having a stem projecting through an opening in the rim and a shoulder extending radially at one end said valve body, and a locking piece for engagement with said stem to secure said tire valve body to said rim;

an eccentric attachment component in the shoulder of said tire valve body, said attachment component being eccentric in respect to said stem and having a length projecting away from said shoulder in an opposite direction than said stem; and a receiving hole or receiving recess in the attaching side of said housing for receiving said eccentric attachment component, whereupon said housing is movable in a plane perpendicular to the length of said eccentric attachment component.

2. An assembly as defined in claim 1, wherein said shoulder has a planar base surface facing away from the rim, and said attaching side of the housing has a planar support surface facing towards the rim, whereupon said base surface and said support surface are movable along each other during installation of the electronic measuring apparatus.

3. An assembly as defined in claim 1, wherein said eccentric attachment component is a flange with a periphery that is eccentric in respect to said stem and connected with a shaft to said shoulder.

4. An assembly as defined in claim 3, wherein said receiving hole or receiving recess comprises a slot for said flange, and a curved channel enabling movement of said shaft when the flange is rotated.

5. An assembly as defined in claim 3, wherein said shaft is eccentric in respect to said shoulder and eccentric in respect to said flange.

6. An assembly as defined in claim 3, wherein said flange has a larger diameter than said shaft.

7. An assembly as defined in claim 4, wherein said slot of the recess has dimensions enabling rotation of said flange around an eccentric centerline perpendicular to said attaching side of the housing, and a curved channel having transversal dimensions enabling movement of said shaft when the flange is rotated.

8. An assembly as defined in claim 1, wherein said eccentric attachment component further comprises a stud and a nut; and said receiving hole or receiving recess is a hole with matching diameter with said stud, and a surrounding support surface for said nut.

9. An assembly as defined in claim 1, wherein said shoulder has an even thickness, whereupon said length of the eccentric attachment is parallel with a centerline of the stem.

10. An assembly as defined in claim 1, further comprising an externally threaded or toothed portion in said stem, and a locking piece for engagement with said threaded/toothed portion to clamp said rim between said locking piece and said shoulder to secure said valve stem and said housing with sensor(s) and electronics to said rim.

11. An assembly as defined in claim 1, wherein said at least one sensor is a tire pressure sensor.

12. An assembly as defined in claim 1, further comprising a single contact area within the bottom side of said housing contacting with the rim bed of said rim.

13. An assembly as defined in claim 12, wherein the bottom side of said housing is concave with smaller radius than the rim bed or planar or convex for said single contact area between the rim bed and the housing.

14. An assembly as defined in claim 10, further comprising elastic material on the bottom side of said housing at least at said single contact area.

15. A combination of an electronic measuring apparatus and a rim of a vehicle wheel, on which a pneumatic tire may be mounted, said combination comprising:

a sensor for sensing a value or values inside the mounted pneumatic tire, and electronics for processing said value(s);

a housing with said sensor and said electronics therein, said housing having a bottom side adapted to seat against a rim bed of said rim, an opposite outer side, and a transversal attaching side connecting said bottom side and said outer side;

a tire valve body having a stem projecting through an opening in the rim and a shoulder extending radially at one end said valve body, and a locking piece for engagement with said stern to secure said shoulder against said rim;

an eccentric attachment component on said shoulder of the tire valve body and projecting away from said shoulder in opposite direction than said stern, said eccentricity being in respect to said stem;

a receiving hole or receiving recess in said attaching side of the housing for receiving said eccentric attachment component; and a planar base surface on said shoulder and a planar support surface on said attaching side, said planar base and support surfaces being in contact with each other.

16. A combination as defined in claim 15, wherein said contact between the planar base surface and the planar support surface is a gliding contact during installation of said housing of said electronic measuring apparatus on the rim.

17. A combination as defined in claim 15, wherein said contact between the planar base surface and the planar support surface is a tight contact prohibiting a glide after installation of said housing of said electronic measuring apparatus on the rim.

18. A combination as defined in claim 15, wherein said planar base surface and said planar support surface are perpendicular to a length of said eccentric attachment component.

19. A combination as defined in claim 15, wherein said planar base surface and said planar support surface are perpendicular to a centerline of said stem.

20. A combination as defined in claim 15, wherein said eccentric attachment component is a flange with a flange diameter, a flange thickness and a periphery that is eccentric in respect to said stem and connected with a shaft to said shoulder.

21. A combination as defined in claim 20, wherein said receiving hole or receiving recess comprises:

a slot with a slot width respective the flange diameter and a slot thickness respective the flange thickness, and a curved channel between said slot and said planar support surface with a channel width enabling movement of said shaft when the flange is rotated.

22. A combination as defined in claim 20, wherein said shaft is eccentric in respect to said shoulder and eccentric in respect to said flange.

23. A combination as defined in claim 21, wherein said shaft has a shaft diameter that is smaller than said flange diameter.

24. A combination as defined in claim 21, wherein said shaft has a shaft diameter, and said channel has a width respective said shaft diameter.

25. A combination as defined in claim 15, wherein said eccentric attachment component further comprises a stud with a stud diameter and a nut engaging said stud.

26. A combination as defined in claim 25, wherein said receiving hole or receiving recess is a hole with a hole diameter matching with said stud diameter, and a surrounding support surface for said nut.

27. A combination as defined in claim 15, wherein the said shoulder has an even thickness, whereupon said eccentric attachment is parallel with the stem.

28. A combination as defined in claim 15, further comprising an externally threaded or toothed portion in said stem, and a locking piece for engagement with said threaded/toothed portion to clamp said rim between said locking piece and said shoulder to secure said valve stem and said housing to said rim.

29. A combination as defined in claim 15, wherein said sensor is a a tire pressure sensor.

30. A combination as defined in claim 15, further comprising one contact area at said bottom side of the housing contacting with a rim bed of said rim.

31. A combination as defined in claim 15, wherein the bottom side of said housing is concave with smaller radius than the rim bed or planar or convex for said single contact area between the rim bed and the housing.

32. An assembly as defined in claim 31, further comprising elastic material on the bottom side of said housing at least at said single contact area.

33. An assembly with an electronic measuring apparatus for installing said electronic measuring apparatus on a rim of a vehicle wheel, on which a pneumatic tire may be mounted, said assembly comprising:

- at least one sensor for sensing a value or values inside the mounted pneumatic tire, and electronics for processing said value(s);
- a housing, in which said sensor and said electronics are contained, said housing having a bottom side adapted to seat against a rim bed in said rim, an outer side directed towards said tire, and an attaching side connecting opposite borders of said bottom side and outer side and transversal thereto;
- a tire valve body having a stem projecting through an opening in the rim and a shoulder extending radially at one end said valve body, and, a locking piece for engagement with said stem to secure said tire valve body with the shoulder and the stem to said rim;
- a projecting attachment component or a receiving recess in said shoulder of the tire valve body in a plane transversal to the stem; and
- a receiving recess or a projecting attachment component respectively in said attaching side of the housing, in engagement with said projecting attachment component or said receiving recess of the shoulder, whereupon said housing is movable in said plane transversal.

34. An assembly as defined in claim 33, wherein said projecting attachment component is an attachment bar and said receiving recess is a receiving groove, said attachment bar and said receiving groove together forming a linear attachment component, said linearity being in a direction transversal to said stem.

35. An assembly as defined in claim 33, wherein said projecting attachment component is an eccentric attachment component on said shoulder projecting away from the shoulder, and said receiving recess is a receiving hole or receiving slot in said attaching side of the housing, said shoulder and said attaching side having planar surfaces against each other.

36. A combination as defined in claim 33, wherein said sensor is a tire pressure sensor.

37. A combination as defined in claim 36, further comprising a temperature sensor.

38. A combination as defined in claim 33, further comprising a single contact area inside said bottom side of the housing contacting with a rim bed of said rim.

39. An assembly as defined in claim 33, further comprising elastic material on the bottom side of said housing at least at said single contact area.

40. An assembly as defined in claim 33, wherein said said plane is perpendicular to a centerline of the stem.

\* \* \* \* \*

UNITED STATES PATENT AND TRADEMARK OFFICE
CERTIFICATE OF CORRECTION

PATENT NO.       : 7,040,155 B1
APPLICATION NO.  : 11/004610
DATED            : May 9, 2006
INVENTOR(S)      : Tomi Lundell et al.

It is certified that error appears in the above-identified patent and that said Letters Patent is hereby corrected as shown below:

Column 1, line 33, "second seats position" should read --second seat position--.

Column 3, line 3, "said stern;" should read --said stem;--.

Column 5, line 33, "LE" should read --$L_E$--.

Column 5, line 42, "LE" should read --$L_E$--.

Column 5, line 47, "axises" should read --axes--.

Column 6, line 31, "dimensions D7, 117" should read --dimensions D7, H7--.

Column 6, line 48, "in FIG. 3B," should read --in FIG. 3B.--

Column 6, line 63, "LE" should read --$L_E$--.

Column 6, line 66, " $L_E$, of" should read -- $L_E$ of--.

Column 7, line 30, "surface 211*b*" should read --surface 21*b*--.

Column 7, line 39, "about 17', 27°, 40°'" should read --about 17°, 27°, 40°--.

Column 7, line 57, "component I" should read --component 1--.

Column 8, line 7, "axises" should read --axes--.

Column 9, line 39, "transversal" should read --transverse--.

Column 10, line 10, "transversal" should read --transverse--.

Column 10, line 15, "with said stern" should read --with said stem--.

Column 10, line 19, "than said stern," should read --than said stem,--.

Column 10, line 20, "said eccentricity being in respect to said stem," should read --said attachment component being eccentric in respect to said stem;--

Column 11, line 38, "and transversal thereto;" should read --and transverse thereto;--.

Column 12, line 1, "valve body, and, a locking" should read --valve body, and a locking--.

UNITED STATES PATENT AND TRADEMARK OFFICE
CERTIFICATE OF CORRECTION

PATENT NO.        : 7,040,155 B1
APPLICATION NO.   : 11/004610
DATED             : May 9, 2006
INVENTOR(S)       : Tomi Lundell et al.

It is certified that error appears in the above-identified patent and that said Letters Patent is hereby corrected as shown below:

Column 12, line 5, "in a plane transversal to" should read --in a plane transverse to--.

Column 12, line 12, "in said plane transversal" should read --in said transverse plane--.

Column 12, line 17, "said linearity being in a direction transversal to said stem" should read --said linear attachment component extending in a direction transverse to said stem--.

Column 12, line 26, "A combination" should read --An assembly--.

Column 12, line 29, "A combination" should read --An assembly--.

Column 12, line 30, "A combination" should read --An assembly--.

Column 12, line 37, "wherein said said plane" should read --wherein said plane--.

Signed and Sealed this

Thirty-first Day of July, 2007

JON W. DUDAS
*Director of the United States Patent and Trademark Office*